May 20, 1941.　　　H. V. OLSON　　　2,242,593
STEERING STABILIZING DEVICE
Filed Sept. 23, 1939　　　2 Sheets-Sheet 1
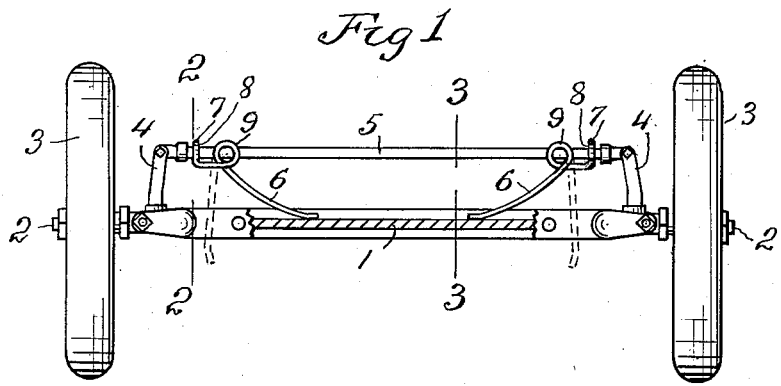
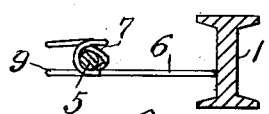
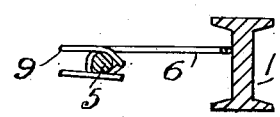
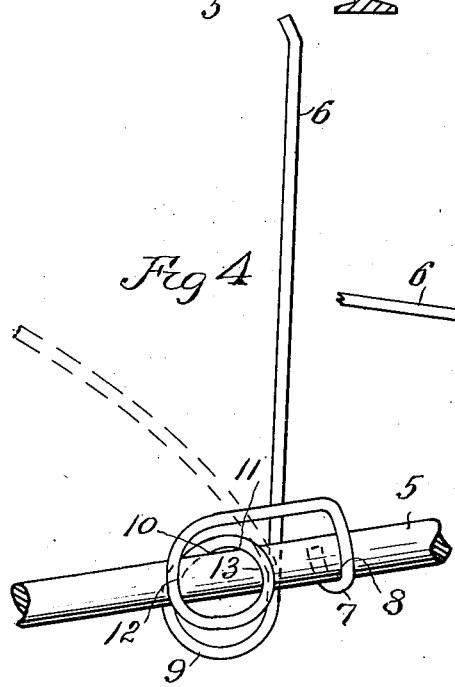
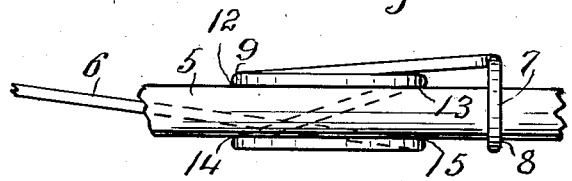
INVENTOR.
Herbert V. Olson
BY Warren D. House
His ATTORNEY.

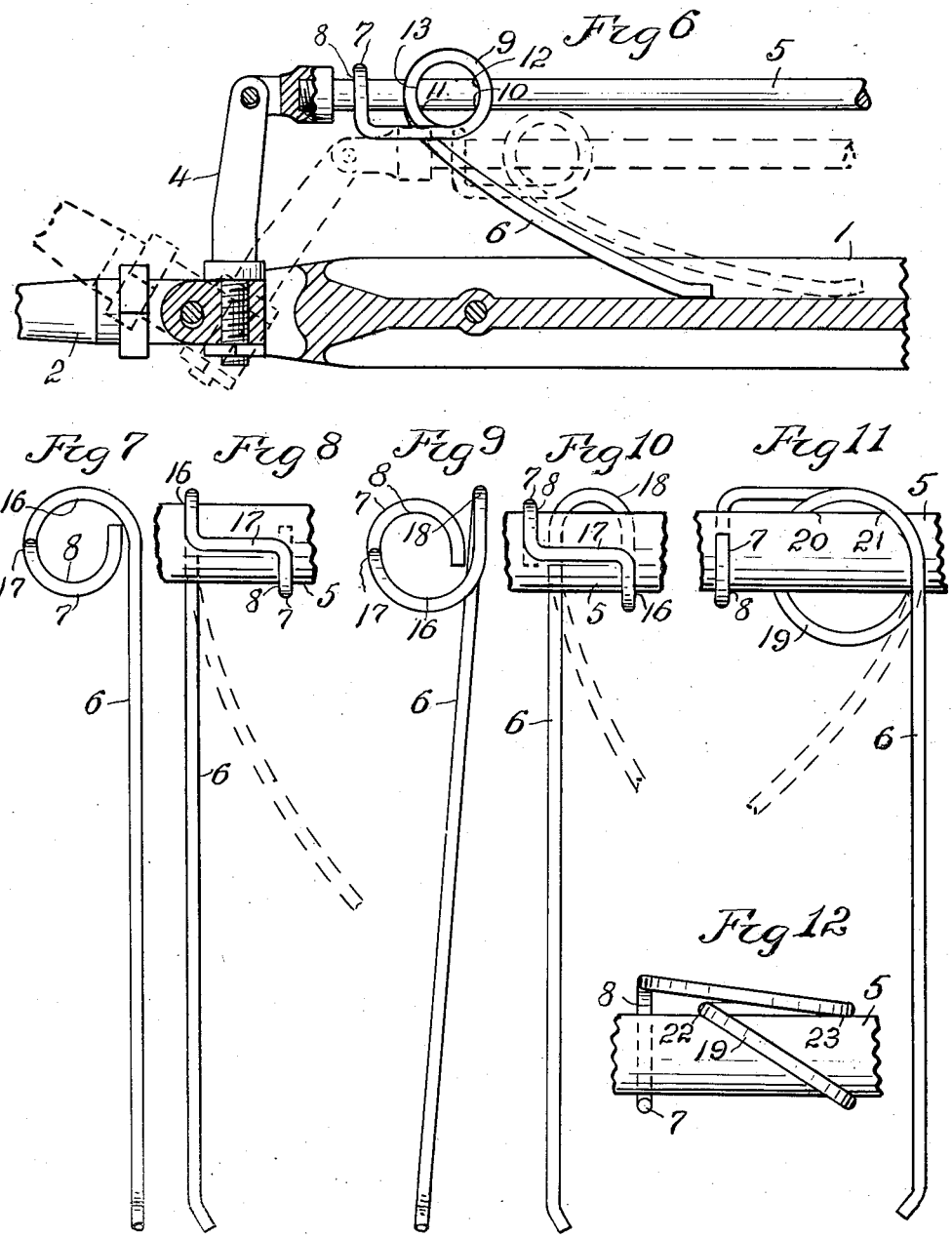

Patented May 20, 1941

2,242,593

UNITED STATES PATENT OFFICE 2,242,593

STEERING STABILIZING DEVICE

Herbert V. Olson, Kansas City, Kans.

Application September 23, 1939, Serial No. 296,231

3 Claims. (Cl. 280—89)

My invention relates to improvements in steering stabilizing devices adapted for use in connection with the steering mechanism of an automobile of the type having a front axle, a spindle pivoted thereto having a steering arm, and a steering connecting rod pivoted to said steering arm.

One of the objects of my invention is the provision of a novel device for stabilizing and preventing "shimmying" or wobbling of the front wheels of the automobile.

A further object of my invention is the provision of a novel device of the kind described, which is simple, cheap, strong, durable, not likely to get out of order, which can be easily and quickly applied to an automobile by an unskilled person, and without requiring the disassembling of any of the parts of the automobile, which permits easy steering, and which, while yieldingly holding the front wheels in the straight ahead position, holds them within a wide range of movement from turning in either direction from the positions to which they may be turned.

The novel features of my invention are hereinafter fully described and claimed.

In the accompanying drawings which illustrate my invention,

Fig. 1 is a top view, partly broken away, of one embodiment of my invention, showing a front wheel assemblage of usual type including the front wheels supporting the spindles pivoted to the front axle and having the steering arms, the connecting rod connecting the steering arms, and two stabilizing devices of one form of my invention operatively engaged with the connecting rod and with the axle.

Fig. 2 is a sectional view, enlarged, on the line 2—2 of Fig. 1.

Fig. 3 is a sectional view, enlarged, on the line 3—3 of Fig. 1.

Fig. 4 is an enlarged perspective view of one of the stabilizing devices, of the form shown in Figs. 1, 2 and 3, shown operatively engaged with a portion of a connecting rod.

Fig. 5 is a further enlarged rear elevation view of what is shown in Fig. 4.

Fig. 6 is a top view, enlarged and partly in horizontal section, of a portion of the front wheel assemblage shown in Fig. 1, and showing one of the stabilizing devices, of the form shown in Figs. 1 to 5, operatively engaged with the connecting rod and the axle.

Fig. 7 is a side view of a stabilizing device of another form of my invention.

Fig. 8 is a top view of the stabilizing device shown in Fig. 7 shown operatively engaged with a portion of a connecting rod.

Fig. 9 is a side view of a stabilizing device of another form of my invention.

Fig. 10 is a top view of the stabilizing device, shown in Fig. 9, mounted upon a portion of a connecting rod.

Fig. 11 is a top view of still another form of my invention, shown operatively engaged with a portion of a connecting rod.

Fig. 12 is a rear elevation of what is shown in Fig. 11.

Similar characters of reference designate similar parts in the different views.

1 designates a front axle of the usual I beam type having longitudinal channels at its front and rear and having pivoted to its ends in the usual manner the two spindles 2 supported by the front wheels 3, and respectively provided with the rearwardly extending steering arms 4 pivoted to the ends of the usual connecting rod 5.

Referring to Figs. 1 to 6 which show the preferred embodiment of my invention, 6 designates one leverlike end portion of a spring rod, which extends into the rear channel of the axle 1 and has sliding frictional pressing engagement with the rear side of the axle 1.

The other end portion of the spring rod has a hook 7 through which extends the connecting rod 5, the inner side of the hook forming a recessed portion 8 which contacts with the rear side of the connecting rod 5.

Intermediate of the portions 6 and 7, the spring rod has a spiral portion 9 with a vertical axis. The connecting rod 5 is disposed between coils of the spiral portion 9.

In operatively applying the spring rod 6—7 and 9, as shown in Fig. 6, and at the left in Fig. 1, the hook 7 is first hooked over the rod 5, after which the spring rod is swung to the right, as viewed in Figs. 1 and 6, and to the left, as viewed in Fig. 4, so as to bring the connecting rod 5 between the coils of the spiral portion 9 and the leverlike portion 6 having its forward part tightly pressing against the axle 1 and in sliding frictional engagement therewith.

When the spring rod stabilizing device is thus applied to the connecting rod 5, with the hook 7 closely adjacent to the left end of the connecting rod 5, as viewed in Figs. 1 and 6, the inner side of the spiral portion 9 will contact at and between the points 10 and 11, Fig. 4, with the front side of the connecting rod 5, the side which is opposite to the side of the connecting rod that is contacted by the recessed portion 8 of the hook 7.

The portion of the spiral 9 at and between the points 10 and 11 constitutes a concave or recessed portion of the spring rod, which forms a fulcrum bearing against the front side of the connecting rod.

When the stabilizing device is in its operative position, the tension created by springing the leverlike portion 6 into rubbing pressing engagement with the axle 1, cramps the recessed portions 8 and 10 to 11 into tight holding engagement with the connecting rod 5, thus holding the spring rod stabilizing device from movement lengthwise on the connecting rod, when the front wheels are turned to the right or left in steering.

Another stabilizing spring rod 6—7—9, corresponding in structure to the one just described, is applied to the axle and the other end portion of the connecting rod 5, as shown in Fig. 1, but reversed end for end and side for side with respect to the other stabilizing spring rod.

Preferably the coils of the spiral 9 have a lead such that they are so spaced between them, with respect to the diameter of the connecting rod 5, that the spiral portion 9 will contact at two diametrically opposite points 12 and 13 against the top of the connecting rod 5, and at two diametrically opposite points 14 and 15 with the bottom of the rod 5, as shown in Figs. 4 and 5. This contacting of the spiral portion 9 with the connecting rod 5 stabilizes the spring rod on the connecting rod, so that its tension when pressing against the axle does not tend to make it turn on the connecting rod, and eliminates any liability of its working out of the channel in the axle.

When the front wheels are in the straight ahead position, the frictional engagement of the stabilizing spring rods 6—7—9 tend to hold the wheels in such position, and likewise when the wheels are turned to the right or left to any position, within a wide range of movement from the straight ahead, the spring rods 6—7—9 yieldingly hold the wheels from moving in either direction.

In the form of my invention, shown in Figs. 7 and 8, the stabilizing spring rod has the hook 7 having the recessed inner side portion 8 which contacts with the front side of the connecting rod 5, and it has the leverlike portion 6 which has pressing sliding frictional engagement with the rear side of the axle 1. In lieu of the spiral portion 9 of the form shown in Figs. 1 to 6, it has, intermediate of the portions 6 and 8, an intermediate portion comprising an inner recessed portion 16 which contacts with the rear side of the connecting rod 5, and engages at its ends with the portion 6 and with a longitudinal portion 17 disposed at the side of the connecting rod 5 opposite to the side at which is disposed the portion 6, as shown in Fig. 8.

In the form shown in Figs. 7 and 8, the hook 7 is engaged with an end portion of the connecting rod 5 and the portion 6 is then swung to engage the rear side of the axle 1, and to engage the portion 16 with the rear side of the connecting rod, the tension thus created causing the recessed portions 8 and 16 to cramp into holding engagement with the connecting rod 5.

In the form shown in Figs. 9 and 10, the spring rod is provided with the hook 7 having the inner recessed portion 8 contacting with the rear side of the connecting rod 5, the leverlike portion 6 which has pressing sliding frictional engagement with the rear side of the axle 1, the recessed portion 16, which contacts with the front side of the connecting rod 5, and the longitudinal connecting portion 17, as in the form shown in Figs. 7 and 8. It is also provided with an arcuate portion 18, the ends of which merge with the portion 16 and with the portion 6 respectively, which portion 18 is at the side of the connecting rod 5 opposite the side at which is disposed the longitudinal portion 17.

In the form shown in Figs. 9 and 10, the hook 7 is first engaged with the connecting rod 5, and the portion 6 is swung into pressing engagement with the rear side of the axle 1, thus cramping the portions 8 and 16 into holding engagement with the connecting rod 5 at opposite sides thereof. The arcuate portion 19 imparts additional scope of resiliency to the spring rod for eliminating liability of its being deformed when sprung into operative engagement with the axle, as does the spiral portion 9 in the form shown in Fig. 1.

In the form shown in Figs. 11 and 12, the spring rod stabilizing device is provided with the hook 7 having its inner recessed side 8 contacting with the front side of the connecting rod 5. It has the leverlike portion 6 for pressing sliding frictional engagement with the axle 1, and intermediate of these portions and merging therewith it is provided with a spiral portion 19 through which extends transversely the connecting rod 5, which spiral portion, however is half a coil shorter than the spiral portion 9 of the form shown in Fig. 1.

The spiral portion 19 engages at its inner side at two points 20 and 21 with the rear side of the connecting rod 5. When the hook 7 is engaged with the connecting rod 5, the portion 6 is swung toward the left, as viewed in Fig. 11, into pressing sliding frictional engagement with the rear side of the axle 1, thus causing the recessed portion 8 and the recessed portion at the inner side of the spiral portion 19 between the points 20 and 21 to contact with holding engagement against opposite sides of the connecting rod 5. In the form shown in Figs. 11 and 12, as shown in Fig. 12, the spiral portion 19 contacts with the rod 5 at two diametrically opposite points 22 and 23 with one side only of the connecting rod, instead of at opposite sides thereof, as is the case with the spiral 9 of the form shown in Fig. 1.

As in the form shown in Fig. 1, in each of the forms of my invention, shown in Figs. 8, 10 and 11, two of the stabilizing spring rods are applied respectively to opposite end portions of the connecting rod 5, and the devices of each pair are reversely applied end for end and side for side, so that the portions 6 may have proper engagement with the axle 1.

In each form of my invention shown and described, the two stabilizing spring rods, in addition to stabilizing the front wheels, prevent rattling at worn joints where the connecting rod 5 pivots to the steering arms 4 of the spindles, by pressing rearwardly against the connecting rod.

Other modifications of my invention, within the scope of the appended claims, may be made without departing from the spirit of my invention.

What I claim is:

1. In a device of the kind described, for use on a vehicle having a front axle, a spindle pivoted thereto and having a steering arm, and a steering connecting rod pivoted to said arm, a spring having a recessed portion for contacting against one side of said rod, a portion adapted for sliding frictional engagement with said axle, and a spiral portion intermediate of said two portions for contacting at its inner side against the opposite side of said rod, and for contacting at two diametrically opposite points of its coils against the top of said rod and at two diametrically opposite points of its coils against the bottom of said rod.

2. In a device of the kind described, a front wheel stabilizing device comprising a spring having a recessed portion adapted to receive and press against one side of a rod connecting the steering arms of the front spindles of an automobile, said spring having a leverlike portion adapted to have pressing sliding frictional engagement with the front axle to which the spindles are pivoted, and having intermediate of said recessed portion and said leverlike portion a spiral portion adapted to have its inner side press against the opposite side of said rod, said spiral portion being adapted to contact at two diametrically opposite points of its coils against the top of said rod, and to contact at two diametrically opposite points of its coils with the bottom of said rod.

3. In a device of the kind described, for use on a vehicle having a front axle, a spindle pivoted thereto having a steering arm, and a steering connecting rod pivoted to said arm, a spring having a recessed portion adapted to contact with one side of said rod, a portion adapted for sliding frictional engagement with said axle, and a spiral portion, intermediate of said portions, provided with two coils, one above the other, adapted for disposal respectively above and below said rod, said spiral portion between said coils having its inner side adapted to contact with the opposite side of said rod.

HERBERT V. OLSON.